H. & G. DUMARS.
ILLUMINATED DISPLAY DEVICE.
APPLICATION FILED JAN. 30, 1917.
1,230,879.
Patented June 26, 1917.
2 SHEETS—SHEET 1.
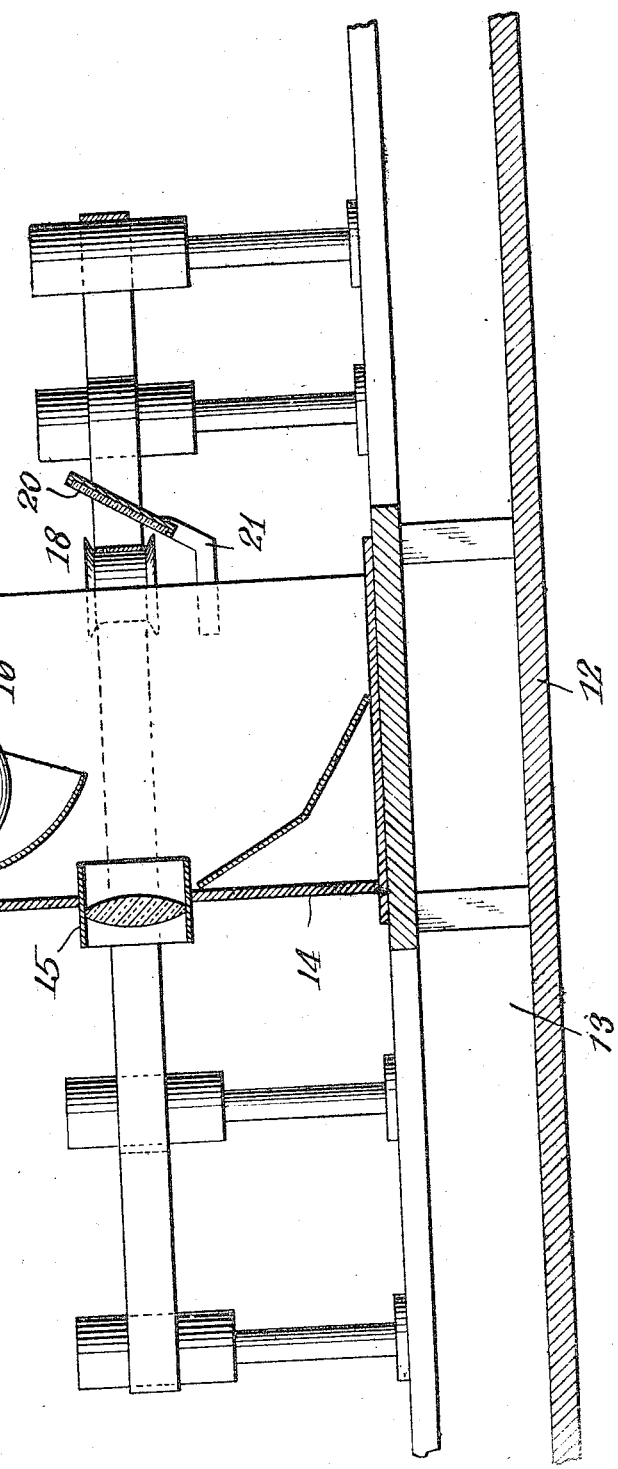
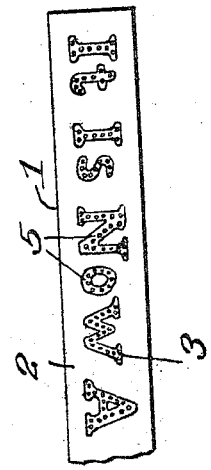
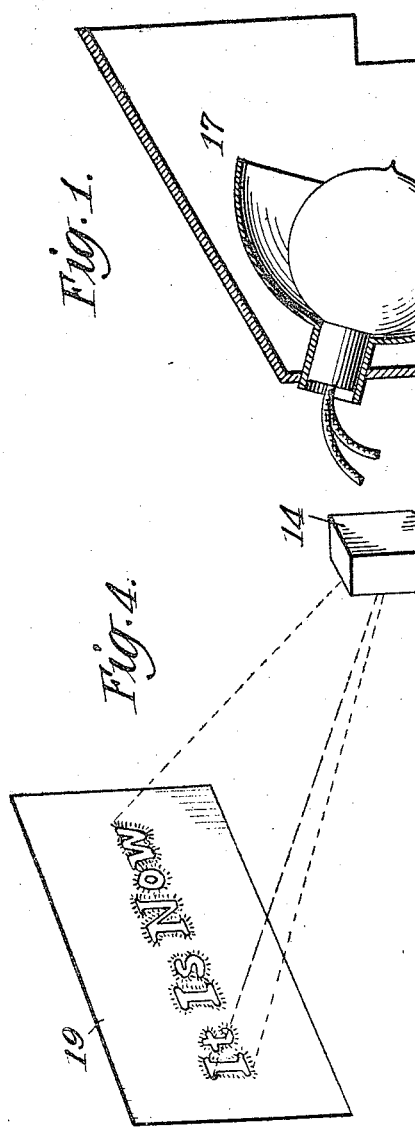

H. & G. DUMARS.
ILLUMINATED DISPLAY DEVICE.
APPLICATION FILED JAN. 10, 1917.
1,230,879.
Patented June 26, 1917.
2 SHEETS—SHEET 2.
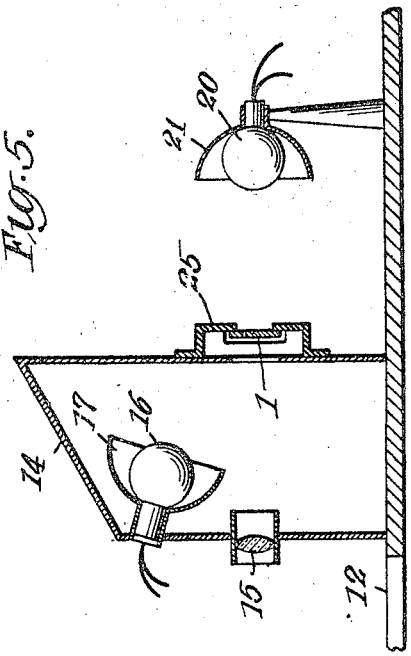
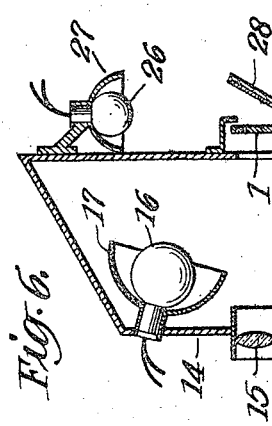
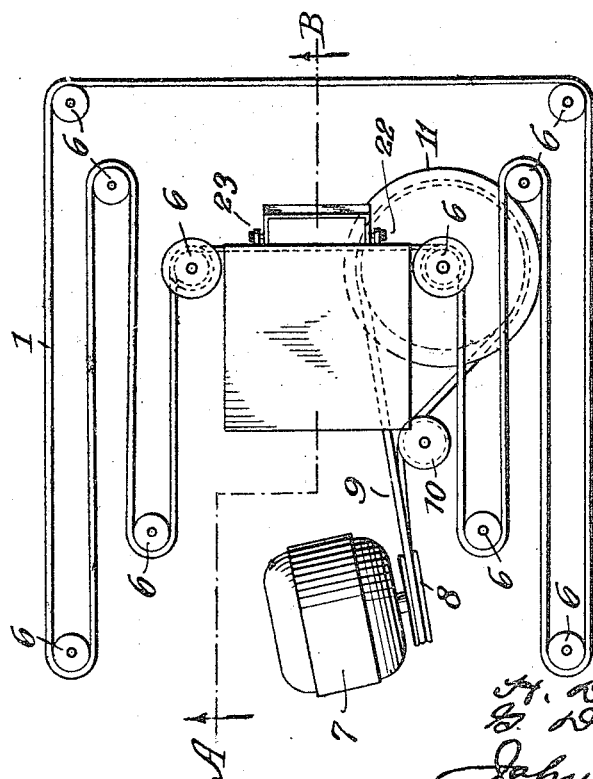
INVENTOR
H. Dumars
G. Dumars
BY John D Morgan
ATTORNEY

UNITED STATES PATENT OFFICE.

HORACE DUMARS, OF NEW SUFFOLK, AND GERALD DUMARS, OF NEW YORK, N. Y.; SAID GERALD DUMARS ASSIGNOR TO SAID HORACE DUMARS.

ILLUMINATED DISPLAY DEVICE.

1,230,879.      Specification of Letters Patent.      Patented June 26, 1917.

Application filed January 10, 1917. Serial No. 141,566.

*To all whom it may concern:*

Be it known that we, HORACE DUMARS and GERALD DUMARS, citizens of the United States, and residents of New Suffolk, in the county of Suffolk and State of New York, and New York, in the county of New York and State of New York, respectively, have invented certain new and useful Improvements in Illuminated Display Devices, of which the following is a specification.

The invention relates to an apparatus for displaying illuminated advertising and amusement matter and in certain aspects the invention relates to such devices designed to display continuously changing legends, designs, or other representations.

Objects and advantages of the invention will be set forth in part hereinafter, and in part will be obvious herefrom or may be ascertained through practice with the invention, the same being effectuated and attained through the means and combinations pointed out in the appended claims.

The invention consists in the novel parts, constructions, arrangements, combinations and improvements herein shown and described.

The accompanying drawings referred to herein, and constituting a part hereof, illustrate one embodiment of the invention, and together with the description serve to explain the principles thereof.

Of the drawings:

Figure 1 is a central longitudinal section substantially on the line A—B of Fig. 2;

Fig. 2 is a plan view, on a reduced scale and partly diagrammatic, corresponding to Fig. 1;

Fig. 3 is a fragment, on an enlarged scale, of a legend and the carrying band therefor;

Fig. 4 is a perspective view, partly diagrammatic, of the apparatus represented as projecting the portion of legend shown in Fig. 3;

Fig. 5 is a vertical longitudinal central section, on a reduced scale, showing the use of different sources of light to produce the design by both reflected and projected light; and Fig. 6 is a view similar to Fig. 5, showing the use of two lamps, the light which is projected through the legend or design being reflected from one of the lamps through the design by a mirror.

In illuminated advertising display, whether the design be viewed at a great distance or close at hand, the display, to be effective, must excite the curiosity and attention of observers to an extent such that they will remember the advertised matter, the advertiser hoping thereby to secure future results. In devices of the kind indicated, the production of an effect which not only attracts and holds the attention but in addition strongly excites the curiosity and wonder of the observer, is of actual practical value to the advertiser. It is also useful and desirable to produce such effects in a manner whereby they may be utilized not only for long distance display, such as from the upper part of high buildings, where the appearance to the observer is largely due to the distance, but also in near at hand work, such as inside rooms, show window advertising, and other situations where the observer views the display from comparatively near at hand. The latter feature is also valuable in that the advertising display, while having the desirable features indicated, may be located in a store or other place where the advertised commodity is vended. In the present invention these various features of usefulness and desirability are embodied in a mechanism and design which may be used both in near at hand work and in long distance work as well.

In the process included in the present invention a design is displayed at an exhibition locus, the design being conveyed thereto both by reflected and transmitted or projected light, this effect being preferably obtained from one original design. In the preferred embodiment thereof, the design is outlined in and by materials and media whereby light is projected upon the surface of the design and reflected therefrom to the display or exhibition locus and coincidently therewith light is transmitted through the design and projected therefrom to the display locus, the light reflected from the face of the design and the light projected through the design constituting a single and unitary effect at the exhibition locus.

Referring more particularly to the illustrated apparatus showing by way of example an embodiment of the invention and referring for the present more particularly to Figs. 1, 2 and 3, a design bearing element, preferably a flexible traveling endless band 1 is provided having a design, shown in the form of a legend, the surrounding surface 2 of the band and the surface 3 of the legend having opposite properties with respect to the reflection of light, that is, the surface of the band surrounding the legend or design may be in black or some other light absorbing and non-reflecting color while the legend itself may be in white or some other light-reflecting and relatively non-absorbing color.

To permit the simultaneous outlining or defining of the design both in the light reflected from the face thereof and by the light projected or transmitted through the band, the design bearing band is perforated in a form or order corresponding to the design, the light from the rear being transmitted through such perforations. In Fig. 3 the perforations are indicated by 5, and follow the contours of the letters of the legend. The relative proportion of the surface of the design which shall be perforated, thereby determining the relative proportion of the surface of the legend of the design which shall be utilized for reflecting light and which shall be utilized for transmitting or passing light, may be varied within limits dependent upon the effect to be produced and whether the display locus is close at hand or is to be viewed at a long distance.

In Figs. 1 and 2 of the drawings the endless legend bearing band 1 is shown looped about a plurality of guiding pulleys 6, the pulleys being disposed and positioned to maintain and travel a maximum length of the band within a limited space. The band is traveled in a suitable manner, as by a motor 7, having a pulley 8 upon its shaft, said pulley driving a belt 9. Belt 9 is guided by a pulley 10 and passes about a driving pulley 11, fixed to the lower end of one of the rollers 6, which thus serves to propel the endless band 1. The motor and its driving pulley may be in a lower compartment 13 of the casing 12, such a compartment being shown at the bottom in Fig. 1.

Mounted in or upon the casing 12 is a housing 14, carrying a suitable lens 15. Within the housing 14 is a light or group of lights 16 provided with suitable reflecting means 17. The endless band 1 is arranged to pass over certain of the guiding pulleys 6 so as to travel the band past the illumination locus 18. The light from the lamp or lamps 16 strikes the legend bearing face of the belt 1 at the illumination locus, the light being reflected therefrom through the lens 15 and showing the legend at the exhibition locus 19 as illustrated in Fig. 4, the legend or other design being viewed at the exhibition locus either by reflected or transmitted light. The surface 19 may be a screen of ground glass or other suitable material whereby the design may be viewed from the opposite or far side if desired.

Means are also provided for transmitting or projecting the light through the legend or other design, and in the embodiment of Figs. 1 and 2, a mirror 20 is carried upon supporting arms 21 and may be provided with angle adjusting means, such as screws 22 and 23. The light from the lamp 16 falls upon the mirror 20 and is transmitted or projected through the perforations 5 formed in the legend or design, and is projected into a unitary design with the reflected light at the locus 19, the reflected and transmitted design being correlated, intermingled and superimposed to produce an effect not obtainable by either alone.

The effect produced is very unusual, attractive, and mystifying. The entire exhibition is full of life and motion. The design travels across the screen and is pictured and illuminated by the light reflected from its face. The light projected through the holes in the design appears as living, moving balls of light or fire of greater brilliancy than the design. Considering a portion of the traveling design as it comes on the screen 19 from the right (viewed from the opposite or far side in Fig. 4), the balls of light will appear at one side of or displaced from, and apparently unrelated to, the corresponding letters or other parts of the design. As the design moves along the balls of fire or bright light approach the letters, or parts of the design to which they belong, and when the letters, or the like reach the central part of the screen, the balls of fire are alined or positioned within and along the letters, defining them in balls or spots of brilliant light. As the letters, or other design parts, pass along from the center toward the other or egress side of the screen, the balls of fire again assume relative motion with respect to the corresponding letters or other design parts, and jump out of alined order in the letters, float away into space and finally disappear. As the letters, or other design parts, and the now displaced balls of fire, approach closely to the point of egress from the screen, they all seem to dissolve into a trail of smoke or hot gases.

It will be understood that while the various changes in appearance have been described as successive steps, in reality they are all occurring simultaneously for different parts of the design. That is, the balls of fire at the entrance point are continually springing into being, moving about in a lively manner and approaching to and finally alining with the corresponding part of the design, the balls of fire at the center are continually traveling in alinement with, and at rest with respect to, their part of the design, and the balls of fire toward the egress point are continually jumping from their places in the design, moving away and they and the design finally seeming to trail away in smoke or hot gas. The apparent display of motion position, changes and energy changes are most astonishing and impressive and will awaken great curiosity and result in great mystification.

It is frequently very effective to perforate only intermittent stretches of the belt or other design carrier, and the alternations from the quiet and comprehensible display of the unperforate portion to the lively, spectacular and mystifying display of the perforated portion adds greatly to the interest and effectiveness of the device.

In Figs. 5 and 6 of the drawings are shown modifications or different arrangements of parts of the invention, it being understood that the same are illustrative and not restrictive in character.

In Fig. 5 of the drawings, the housing 14 is mounted on the casing 12, and has the lens 15. The lamp 16 is utilized in this case to provide only the light which is reflected from the face of the legend or design bearing band 1. The transmitted or projected light is provided by a lamp or group of lamps 20, having a suitable reflector 21, the light being transmitted or projected through the design to produce the effects already described. It will be understood that lenses or other apparatus, either standard or special, may be interposed to modify or control the transmitted light between the lamps 20 and the band 1 where this is desired. In this instance, the endless band 1 at the illumination locus runs through a protecting casing 25 whereby the transmitted light passes only through the band and interference between the two sources of light is prevented.

In Fig. 6 of the drawings a generally similar arrangement is shown for the reflected light. In this instance the transmitted light is provided from a second source, but is transmitted through the legend or design by reflection. For this purpose, a light or group of lights 26 is mounted on the housing above, or to one side, and is provided with a reflector or reflectors 27. A light from the lamp 26 is reflected upon a mirror 28, from which it is transmitted through the design and to the exhibition locus in the manner already described.

From all the foregoing it will be understood that a process and apparatus has been provided realizing the objects and advantages herein set forth, or which may be obvious from the invention, and it will be further understood that changes may be made from the precise structure shown and described without departing from the principles of the invention and without sacrificing its chief advantages.

What we claim as our invention and desire to secure by Letters Patent is:—

1. An illuminated display device including in combination a member bearing a perforate design presented at an illumination locus, a screen at a display locus, and lighting means throwing light upon the face of the design to be reflected therefrom and projected to the screen and projecting light through the perforations in the design to be projected to the screen.

2. An illuminated display device including in combination a member bearing a perforate design traveling past an illumination locus, a screen at a display locus, and lighting means throwing light upon the face of the design to be reflected therefrom and projected to the screen and projecting light through the perforations in the design to be projected to the screen.

3. An illuminated display device including in combination an endless traveling band having a design on the face thereof, the design being defined by perforations in the band, means for traveling the belt and presenting it at the illumination locus, and lighting means throwing light upon the face of the design to be reflected therefrom and projected to the screen and projecting light through the perforations in the design to be projected to the screen.

4. An illuminated display device including in combination an endless traveling band having a design on the face thereof, the design being defined by perforations in the band, means for traveling the belt and presenting it at the illumination locus, a light in front and at one side of the band at the illumination locus, a reflecting surface behind the band at the illumination locus to project light through the perforations in the band, and a screen receiving the images from both the reflected and projected light.

5. An illuminated display device including in combination a band having a perforate design traveling past the illumination locus, a lamp at the front and to one side of the band at the illumination locus, a mirror behind the band at the illumination locus and receiving light from the lamp and projecting it through the perforations in the design, and a screen receiving the images from both the reflected and projected light.

6. A design bearing device for use in illuminating display devices, comprising a supporting surface, a design outlined thereon, the design and the surrounding surface being one light reflecting and the other light absorbing, there being a plurality of light conveying design defining perforations through the support.

7. A design bearing device for use in illuminating display devices, comprising a flexible band having therealong a design, the design and surrounding surface of the band being one light reflecting and the other light absorbing, the band being perforated at a plurality of points by a series of light-transmitting perforations, the perforations being related to define the design.

In testimony whereof, we have signed our names to this specification, in the presence of two subscribing witnesses.

HORACE DUMARS.
GERALD DUMARS.

Witnesses:
JOHN D. MORGAN,
ALAN M. JOHNSON.